United States Patent [19]

Stephens

[11] E Re. 28,561

[45] Reissued Sept. 30, 1975

[54] REVERSIBLE ONE-WAY CLUTCH

[75] Inventor: Leonard W. Stephens, Fairview, Pa.

[73] Assignee: Palmer Filter Equipment Co., Fairview, Pa.

[22] Filed: July 19, 1974

[21] Appl. No.: 490,080

Related U.S. Patent Documents

Reissue of:

[64] Patent No.: 3,679,031
Issued: July 25, 1972
Appl. No.: 78,114
Filed: Oct. 5, 1970

[52] U.S. Cl. ..... 192/44; 81/59.1; 81/63.1
[51] Int. Cl. ..... F16d 41/08
[58] Field of Search ..... 192/44, 72; 81/59.1, 63.1

[56] References Cited

UNITED STATES PATENTS

| | | | |
|---|---|---|---|
| 1,859,600 | 5/1932 | Prettyman | 192/44 X |
| 2,003,155 | 5/1935 | Pfauser | 192/44 |
| 2,153,988 | 4/1939 | Padgett | 81/59.1 |
| 2,707,540 | 5/1955 | Morris | 192/44 X |
| 3,019,872 | 2/1962 | Morris et al. | 192/44 |

*Primary Examiner*—Allan D. Herrmann

[57] ABSTRACT

A reversible one-way clutch suitable to be used in combination with a drive, *for example a wrench body*, and a driven member, *for example a shank*. The clutch is made up of [a drum] *an inner body surface* and a plurality of frictional shoes [which connect] *between* the drive [to] *and* the driven member. The shoes are [actuated by cams. The cams] *pressed by cam rollers which* move the shoes out into engagement with *said inner body surface* [the drum connecting a driven member to the drive]. A reversing mechanism is provided for [holding the shoes away from the cam] *allowing the shoes to slide* when a torsional force is exerted on the drive in a first direction relative to the driven member but [allowing] *forcing* the shoes [to move toward] *against* the cam *rollers* [and] *to* transmit force when a torsional force is exerted in an opposite direction between said drive and driven member. The reversing mechanism makes it possible to selectively drive the clutch either in a first direction or in a second direction.

15 Claims, 10 Drawing Figures

REVERSIBLE ONE-WAY CLUTCH

Matter enclosed in heavy brackets [ ] appears in the original patent but forms no part of this reissue specification; matter printed in italics indicates the additions made by reissue.

STATEMENT OF INVENTION

This invention relates to clutches and, more particularly, to a specific type of clutches for wrenches.

OBJECTS OF THE INVENTION

It is an object of the invention to provide an improved clutch.

Another object of the invention is to provide an improved wrench [handle].

Another object is to provide a one-way clutch that is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

REFERENCE TO PRIOR ART

This invention is an improvement over U.S. Pat. Nos. 2,707,540 and 3,019,872 to Harry C. Morris.

DETAILED DESCRIPTION OF THE DRAWINGS

Figure 1:
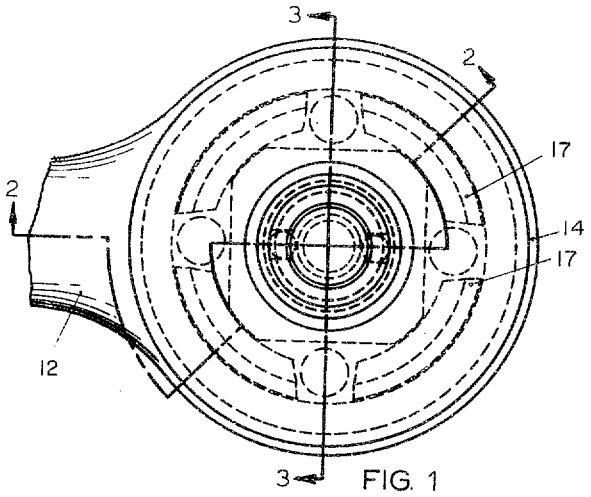
FIG. 1 is a top view of a preferred embodiment of the invention, showing the clutch used in a wrench, *the clutch being disengaged.*

The clutch according to the invention is shown in a preferred embodiment in use in a [ratchet type] wrench for use by mechanics. The wrench is indicated generally at 10, having a drive means by way of a handle *12*, and [is made up of the] major components [, which] include the shank 18, cap 27, *reversing* star wheel 28, shoes 16, cam roller members 19, and *clutch actuating* spring 31. The wrench body 14 [which] has an internal cylindrical surface 15 which *can be* frictionally [engage] *engaged by* the outer cylindrical [surface] *surfaces* of shoes 16. The body 14 has an internal peripheral groove 37, which receives a spring washer [40] *47*. The spring washer [40] *47* engages the rim 38 on the shank and holds the shank 18 in place in the body. The shank rests against the [shoulders] *shoulder* 11 in the body and [freely rotates] *can rotate* between the [shoulders] *shoulder 11 and the washer 47. The corners 56 of the shank, between the cam surfaces 20, are rounded on a radius slightly less than the inside diameter of the shoes 17, so that the shank can rotate relative to the arcuate shoes.*

The shank 18 has the [male] socket wrench receiving *male* member 41, which may be inserted into a suitable socket wrench of a type familiar to those skilled in the art, and a detent ball 42 in hole 71 in the male member urged outward by spring 43 will hold the socket in place. *Spring 43 abuts against shoulder 70 in male member 41.*

The shank 18 has a round stem 21 that is in the form of a cylinder [integrally attached to] *integral with* the cam portion 56 of shank 18. The cam portion 56 is generally square and has the flat cam surfaces 20 on each of its four sides, and these cam surfaces 20 *can engage the rollers 19 which in turn can* engage the ends 17 of shoes 16 and urge the shoes outward into engagement with surface 15.

Figure 3:
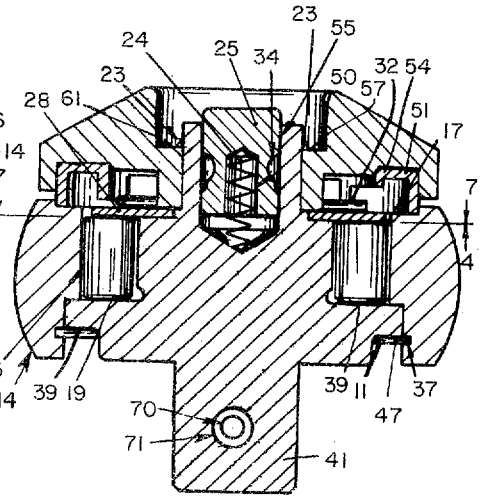
FIG. 3 is a cross sectional view taken on line 3—3 of FIG. 1.
Figure 4:
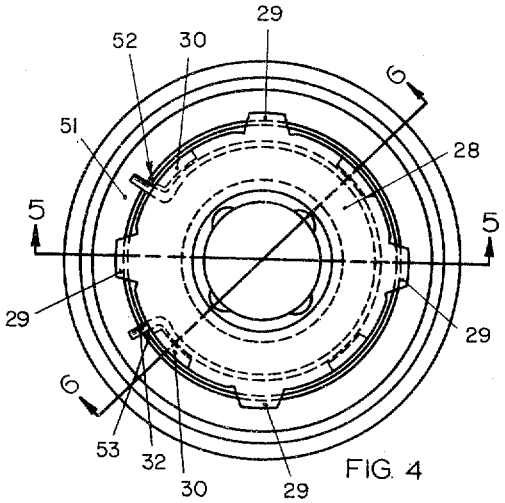
FIG. 4 is a top view of FIG. 5, *and as indicated by line 4—4 of FIG. 3 shows the underside of the cap and star wheel of the wrench.*
Figure 5:
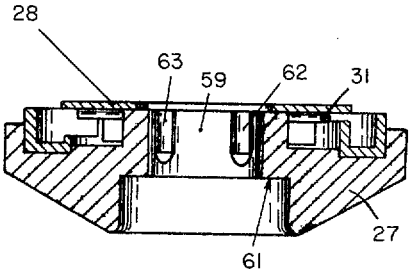
FIG. 5 is a partial cross sectional view taken on line 5—5 of FIG. 4 *and showing the cap and star wheel inverted with respect to FIGS. 2 and 3.*
Figure 6:
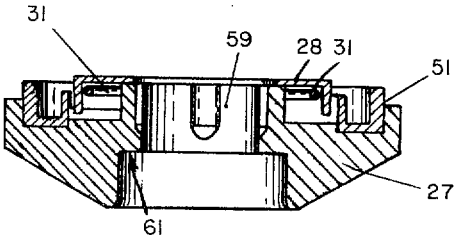
FIG. 6 is *a* partial cross sectional view taken on line 6—6 of FIG. 4.
Figure 10:
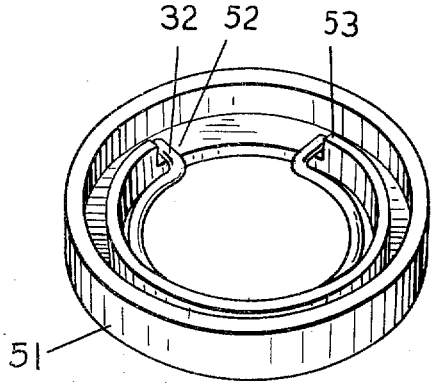
FIG. 10 is [an enlarged] *a perspective* view of [the] *a* press-in washer [and] *that forms part of the cap, and of the clutch actuating* spring [ring], *inverted with respect to FIGS. 2 and 3.*

The wrench is assembled by placing the shank 18 into the [drum] *body* 14 with the rim 38 resting [in the counterbore] *against the shoulder 11* as shown in FIGS. 3 and 4. The snap *spring* washer 47 is then snapped into the groove 37 so that the shank can freely rotate between the [counterbore] *shoulder 11* and the washer. The shoes 16 are then placed inside the cylindrical surface 15 resting on surface 39 *of the shank*, and the [cams] *cam roller members 19* are placed between the [inclined] *bevelled* ends 17 of the shoes. The star wheel 28 is then laid over top of the shoes 16 and the cam roller members 19 in the position shown in the upper [end] *part* of FIG. 7 with the points 29 of the star wheel disposed between the ends 17 of the shoes and overlying the cam roller members 19. It will be noted that the shoes have an arcuate offset 49 cut in them [which] *to* receive the outer curved periphery of the star wheel. The star wheel has [the] upwardly extending lugs 30, *within the circular locus of* which [receive] the spring 31 *is disposed* [and locate it in position]. It will be noted that spring 31 is in the form of a [circle] *ring or annulus* with [the] *spaced apart*, outwardly extending ends 32. The outwardly extending ends 32 [overlie the outer ends of] *turn outwardly between a pair of* the lugs 30 and are received in [groove] *opening* 52 in flange 53 of washer 51 *which is pressed into a groove 54 at the underside of the cap and forms a rigid part of the cap 27. The ring-shaped spring 21, caged within lugs 30, is also housed in an annular recess at the underside of cap 27, above star wheel 28 as viewed in FIGS. 3 and 4.* [The] *A* spring washer 23 is [disposed in] *snapped into* a groove 60 in shank 18.

This washer 23 *overlies the well bottom 61 of cap 27 and* holds the cap 27 in place. [The cap 27 has a groove cut in the underside of it which receives pressed-in washer 51 and the ends 32 of the spring are received in the groove 52 in upturned flange 53 of washer 51.]

The [groove 33 limits] *ends of the opening 52 limit* the movement of the ends 32 of the *annular* spring 31 and [forces] *force* the spring to rotate together with the cap when the cap is rotated. *When the cap is rotated, one end of the opening 52 engages and moves a first end 32 of the spring 31, and the other end 32 of the spring is pressed against an upturned lug 30 of the star wheel 28. When the cap is rotated in the opposite direction, the other end of the opening 52 engages said other end 32 of the spring and the first end of the spring is pressed against a star wheel lug 30.* Thus, the star wheel 28 is forced to rotate with the cap by the ends 32 of the spring which engage the lugs 30.

The button 25 is received in a central bore 55 in *stem 21 at* the end 44 of the shank 18. [The corners adjacent the cams 20 are rounded off at 56 on the radius slightly less than the inside diameter of the shoes 17, so that the shank may rotate freely inside the shoes.] A spring 24 is supported inside the bore 57 in the button 25, and this spring urges the button outward.

The stem 21 has a radial hole 33 in it, in which [the] locking balls 26 are received. These locking balls 26 [may] move into the large *peripheral* recess 34 *in the button 25* when the button is in the depressed position, that is, pushed downward, and when the button 25 is [moved] *held* upward *by spring 24,* the locking balls 26 are received in the shallow *peripheral* recess 35 *in the button 25.*

Figure 2:
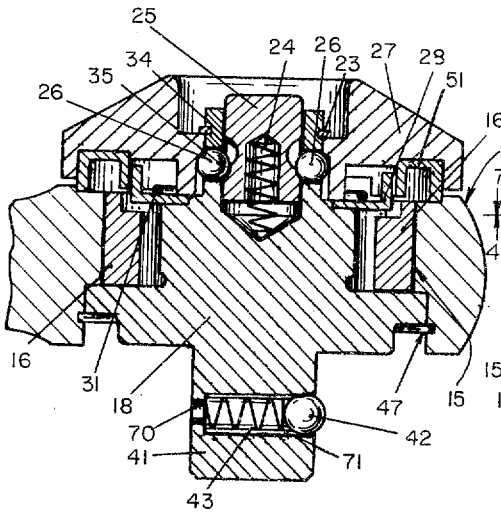
FIG. 2 is a cross sectional view taken on line 2—2 of FIG. 1, *but with the cap of the wrench turned to engage the clutch.*

[The hole] *A central bore* 59 in the cap 27, *coaxial with the shank 18,* receives the *shank* stem 21, and the [stem 21 has a peripheral groove 60 which receives the spring washer 23 which rests against the shoulder 61 in the cap and holds the cap on the shank] *surface of bore 59 has a first pair of diametrically opposed grooves or recesses 62 and a second pair of diametrically opposed grooves or recesses 63.* The locking balls 26 may move into either of the [two] circumferentially spaced *pairs of* grooves 62 or 63, depending on the position *to which* the cap 27 is rotated relative to the shank. Thus, when the cap is rotated *with the button 25 in the depressed position and the balls 26 in the deep peripheral recess 34 of the button* [so that a ball 26 is lined up] *the stem recesses 33 containing the balls 26 can be aligned* with one of the *pairs of recesses or* grooves 62 or 63, the [ball] *balls* may move outward and allow the button 25 to jump up urged by the spring 24 so that the [ball rests] *balls rest* in the shallow groove 35, as shown in FIG. 2. Thus, the cap 27 will be [restrained to rotate with] *fixed to* the shank 18 [, and the spring 31 will be forced to rotate with the shank since its ends are received in the groove 51].

*OPERATION OF THE PREFERRED EMBODIMENT*

Figure 7:
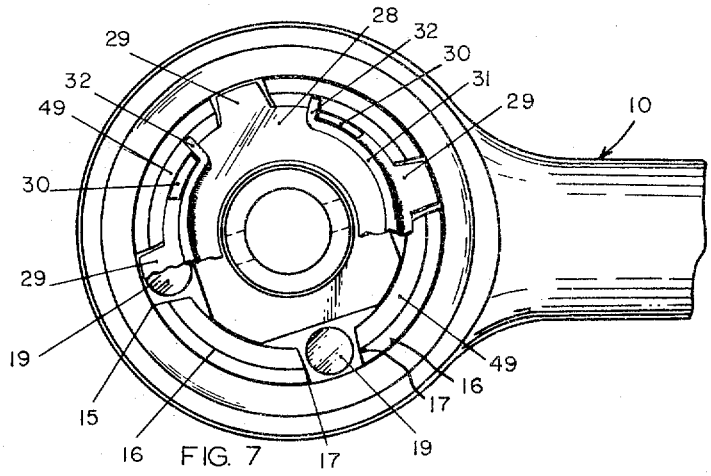
FIG. 7 is a [cross sectional view taken on] *top view of the wrench with the cap, locking balls and button removed, and with the star wheel and clutch actuating spring partly broken away, showing the clutch shoes and rollers at the level indicated by* line 7—7 of FIG. 3.
Figure 8:
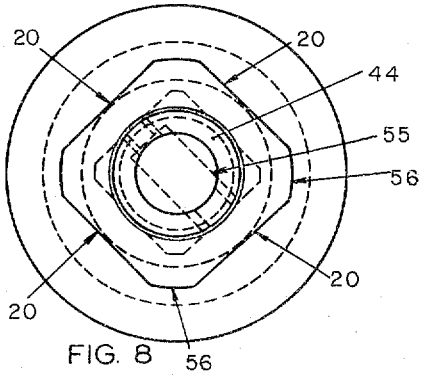
FIG. 8 is a [bottom] *top* view of the shank shown in FIG. 9.
Figure 9:
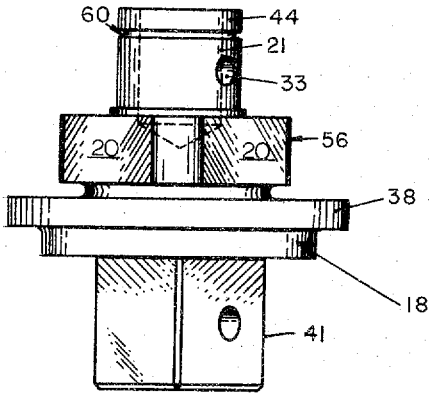
FIG. 9 is a side view of the shank as shown in FIG. 8.

*Assume that the button 25 has been depressed, the positioning balls 35 are in the large button recess 34 so that the cap is not fixed to the shank 18, and the cap is turned to a position where the balls 35 are midway between grooves 62, 63 in the cap. The button cannot pop up because the balls 35 cannot move radially out of the large button recess 34. The ring-like spring 32, which is housed in and rotatable with the cap, is in a neutral position as shown in FIG. 7, as is the star wheel 28 whose points 29 are between successive clutch shoes 16. The rollers 19 are also in neutral positions between the clutch shoes.*

*Now suppose that the cap is rotated counterclockwise as viewed from the top while the shank 18 is held manually or otherwise against rotation. As viewed in FIG. 7, the right hand end 32 of spring 31 is pushed counterclockwise by the adjacent end of opening 52 in flange 53 of washer 51 of the cap, causing the left hand end 32 of the spring to push counterclockwise the adjacent upstanding lug 30 of star wheel 28. Star wheel 28 is thus resiliently pressed to rotate counterclockwise, and its points 29 engage ends of the shoes 16, shifting the shoes counterclockwise until the opposite bevelled ends 17 of the shoes press the rollers 19 against the cam surfaces 20 of the shank 18. Spring 21 is compressed until the locking balls 26 come opposite grooves 63, when the button spring 24 presses the button up and forces the balls 26 into the cap recesses 63 aligned with the stem recesses 33, fixing the cap to the shank in a first setting. If the wrench handle 12 and body 14 are now turned counterclockwise, the shoes 16 are pressed by the rollers against the inner annular surface 15 of the body 14, and the rollers engaging the shank force the shank to rotate with the body, without any play. However, if the wrench handle and body are turned clockwise the shoes are not jammed against the inner annular surface 15 of the wrench body.* [Since the points 29 of the star wheel engage the ends of the shoe, the shoes will be moved by the shank and] *The shoes can* slide [around] inside the [drum freely] *wrench body* as the handle is rotated in this [particular] *clockwise* direction, *and thus the clutch operates only one way.*

[When] *Conversely, when* the cap is rotated *clockwise from the neutral position* so that the [ball 26 moves] *balls 26 move* into the [groove 63] *grooves 62 the cap will be fixed to the shank in a second setting,* the [ends] *left hand end 32* of the spring will engage the [opposite] *other* end of the [slot] *opening* 52 in the washer 51 *of the cap, the right hand end of the spring will push the star wheel clockwise, and the points 29 of the star wheel hold the shoes 16 clockwise relative to the position illustrated in FIG. 7, with rollers 17 jammed between the bevelled shoe ends and the shank cam surfaces 20, so that with clockwise movement of the wrench body the shank must turn, whereas the shank is not forced to turn* when the handle is rotated in the other, *i.e. counterclockwise,* direction relative to the shank. [When the handle is rotated opposite to the direction that the end 32 engaged the end defining groove 52 of the washer 51, the cam surface 20 will force cam roller members 19 outward so that they drive the shoes 16 into engagement with the surfaces 15.]

[The drive washer 64 is pressed into the cap 27 and forms a convenient bearing therein for spring 31.]

*The star wheel 28 constitutes a single rigid member for positioning all the clutch shoes 16 by engagement therewith when actuated by the cap 27 and the annular spring 31. Reversing of the star wheel reverses the direction in which the shank 18 can be driven. The cap 27 constitutes a rigid actuating member which, by engagement with the actuating spring 31, actuates the reversing member 28 and thus the clutch.*

*The positioning button 25 does not protrude from the cap 27, even in its outward or raised position, so that it is sheltered against being accidentally depressed.*

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

[1. A clutch comprising, a body member having a cylindrical surface, drive means connected to said body member, shoes adapted to frictionally engage said cylindrical surface, said shoes each comprising a part of a cylinder having an outside surface of substantially the same curvature as said body member, cam means engaging the ends of said shoes, and cam roller members engaging said cam means, said cam roller members being supported on a shank, a reversing means, said reversing means comprising a member for holding said cam means from forcing said shoes into engagement with said body member when said drive means is rotated in a first direction and allowing said cam means to force said shoes into engagement with said body member when said drive means is rotated in a second direction, said reversing means comprising a member for reversing the action of said drive means relative to said shoes and said body member, actuating means comprising a star wheel having points overlying said cam roller members and engaging the ends of said shoes and upwardly extending lugs engaging an actuating member on said clutch.]

[2. The clutch recited in claim 1 wherein said actuating means comprises a cap having a groove therein receiving at least one said lug member, said reversing means comprises means for positioning said cap relative to said shank whereby said shoes are allowed to frictionally engage said body member when said drive member is rotated in the first direction, and said shoes are held from engagement with said body member when said cap is rotated in a second direction.]

[3. The clutch recited in claim 2 wherein said reversing means further comprises a plurality of said lugs on said star wheel, a washer having an upturned flange and a groove in said flange, a spring formed into a ring and disposed within said lugs, the ends of said spring being turned outwardly, said outwardly extending ends being received in said groove in said flange, means to position said cap in a first position where a first end of said spring engages a first end of said groove and a second end of said spring engages a first said lug for reversing, and to position said cap for reversing when said first end of said spring engages a second end of said groove and said second end of said spring engages a first said lug for forward drive.]

4. The clutch recited in claim [3] *18* wherein said means [to position] *for fixing* said cap comprises a [round] *cylindrical* stem on said shank, a central bore in said [round] *cylindrical* stem, a radial hole in said [round] *cylindrical* stem, a positioning button in said central bore, a [shall] *shallow* recess and a deep recess in said button, a spring engaging said button, urging said button outwardly, said cap having a [first] central bore receiving said [round] *cylindrical* stem, two circumferentially spaced grooves in said cap [on] *in* the surface defining said central bore *of the cap*, a positioning ball in said radial [hold] *hole*, said ball being [adapted to move] *moveable* out of said grooves in said cap and into said deep recess in said button when said button is in a first position, said ball being [adapted to move] *moveable* into one or the other of said grooves in said cap and into said shallow recess in said button when said [cap] *button* is in a second position, said cap being [in position to engage] *engaged with* said first end of said *ring-shaped* spring when said [cap is in said first position] *ball is in one of said grooves of the cap* and [to engage] *engaged with* said second end of said *ring-shaped* spring when said [cap is in said second position] *ball is in the other of said grooves of the cap.*

5. The clutch recited in claim [3] *18* wherein said means [to position] *for fixing* said cap comprises a [round] *cylindrical* stem on said shank, a central bore in said [round] *cylindrical* stem, a radial hole in said [round] *cylindrical* stem, a positioning button in said central bore, a shallow recess and a deep recess in said button, a spring engaging said button urging said button outwardly, said cap having a [first] central bore receiving said [round] *cylindrical* stem, four circumferentially spaced grooves in said cap [on] *in* the surface defining said central bore *of the cap*, two balls in said radial hole, said balls being [adapted to move] *moveable* out of said grooves in said cap and into said deep recess in said button when said button is in a first position, said balls being [adapted to move] *moveable* into two of the said grooves in said cap and into said shallow recess in said button when said [cap] *button* is in a second position thus [affecting a balance condition of] *fixing* said cap *relative to said cylindrical stem of said shank*, said cap being [in position to engage] *engaged with* said first end of said *ring-shaped* spring when said [cap is in said first position] *balls are in two of said grooves of the cap* and [to engage] *engaged with* said second end of said *ring-shaped* spring when said [cap is in said second position] *balls are in the other two of said grooves of the cap.*

*6. A clutch comprising*

*a shank,*

*a rotatable body member having an inner annular surface around the shank,*

*arcuate shoes located between the shank and said inner surface for frictionally engaging said inner surface,*

*rollers located between the arcuate shoes and engageable with the ends of the shoes to press them against said inner surface,*

*a rigid positioning member movable in one direction to engage the shoes and hold first ends of the shoes against the rollers and the rollers against the shank whereby when the body member is rotated in said one direction the shoes are held by the rollers against said inner surface and the rollers engaging the shank force the shank to rotate in said one direction but when the body member is rotated in the opposite direction the shoes can slide on said inner surface,*

*the rigid positioning member being moveable in said opposite direction to engage the shoes and hold second ends of the shoes against the rollers and the rollers against the shank whereby when the body member is rotated in said opposite direction the shoes are held by the rollers against said inner surface and the rollers engaging the shank force the shank to rotate in said opposite direction but when the body member is rotated in said one direction the shoes can slide on said inner surface,*

*and actuating means having spring means engageable with the rigid positioning member to press it to its shoe engaging positions.*

*7. The clutch recited in claim 6 wherein the actuating means includes a rigid actuating member moveable to force the spring means to move the rigid positioning member.*

*8. The clutch recited in claim 7 wherein the spring means comprises an annular spring having spaced apart first and second ends,*

*the rigid actuating member being moveable in said one direction to engage said first end and thus press said second end against the rigid positioning member to move the latter in said one direction,*

*the rigid actuating member being moveable in said opposite direction to engage said second end and thus press said first end against the rigid positioning member to move the latter in said opposite direction.*

*9. The clutch recited in claim 8 wherein the actuating member has an annular recess housing the spring.*

*10. The clutch recited in claim 8 wherein the rigid positioning member has lugs within which the spring is disposed, the spring ends being turned outwardly between such lugs for engagement therewith in response to movement of the rigid actuating member.*

*11. The clutch recited in claim 10 wherein the rigid actuating member has an opening in which the outwardly turned spring ends are received, ends of the opening being engageable with the spring ends, when the rigid actuating member is moved, to force the spring to move the rigid positioning member.*

*12. The clutch recited in claim 7 including means for fixing the rigid actuating member relative to the shank in a first setting with the rigid positioning member moved in said one direction, and in a second setting with the rigid positioning member moved in said opposite direction.*

*13. The clutch recited in claim 12 wherein the rigid actuating member comprises a cap coaxial with the shank, and the means for fixing the cap relative to the shank comprise alignable recesses in the cap and shank, a ball located in one of said recesses and moveable partly out of said one recess and into another recess aligned therewith to prevent relative movement of the cap and shank, and a spring pressed button for so moving the ball when recesses are aligned.*

*14. The clutch recited in claim 13 wherein the button is located within and does not protrude from the cap and can be depressed to allow the ball to move out of said other recess and permit relative movement of the cap and shank.*

*15. The clutch recited in claim 14 wherein the button has a recess into which the ball can move from other said recess.*

*16. A clutch comprising*

*a body member having an inner annular surface,*

*drive means for said body member,*

*shoes having outer surfaces for frictionally engaging said annular surface,*

*rollers engageable with the ends of said shoes,*

*a shank having cam means engageable with said rollers,*

*reversing means comprising a rigid positioning member movable in one direction to engage the shoes and press first ends of the shoes against the rollers and the rollers against the cam means of the shank so that when said drive means rotates the body member in said one direction the shoes are held by the rollers in engagement with the body member, forcing the shoes and shank to rotate, whereas when said drive means rotates the body member in the opposite direction the shoes are not so held,*

*said rigid positioning member being movable in said opposite direction to engage the shoes and press second ends of the shoes against the rollers and the rollers against the cam means of the shank so that when said drive means rotates the body member in said opposite direction the shoes are held by the rollers in engagement with the body member forcing the shoes and shank to rotate, whereas when said drive means rotates the body member in said one direction the shoes are not so held,*

*and actuating means having spring means engageable with the rigid positioning member to move it to its shoe engaging positions.*

*17. The clutch recited in claim 16 wherein the rigid positioning member comprises a wheel having portions that overlie said rollers and that are engageable with the shoes.*

*18. The clutch recited in claim 17 wherein the actuating means includes a cap,*

*the spring means comprises a ring-shaped spring having a first and a second end,*

*the cap being engageable with said first end to press said second end against the rigid positioning member and move the latter in said one direction,*

*the cap being engageable with said second end to press said first end against the rigid positioning member and move the latter in said opposite direction,*

*and including means for fixing the cap relative to the shank in a first setting with the rigid positioning member moved in said one direction, and in a second setting with the rigid positioning member moved in said opposite direction.*

* * * * *